June 16, 1959 E. H. CLARK, JR Re. 24,659

VARIABLE ORIFICE CASING FILLING APPARATUS

Original Filed April 2, 1954 3 Sheets-Sheet 1

INVENTOR.
EARNEST H. CLARK, JR.
BY
Mellin and Hanscom
ATTORNEYS

VARIABLE ORIFICE CASING FILLING APPARATUS

Original Filed April 2, 1954 3 Sheets-Sheet 2

INVENTOR.
EARNEST H. CLARK, JR.
BY
Mellen and Hanscom
ATTORNEYS

June 16, 1959 E. H. CLARK, JR Re. 24,659

VARIABLE ORIFICE CASING FILLING APPARATUS

Original Filed April 2, 1954 3 Sheets-Sheet 3

INVENTOR.
EARNEST H. CLARK, JR.
BY
Mellin and Hanscom
ATTORNEYS

United States Patent Office

Re. 24,659

Reissued June 16, 1959

24,659

VARIABLE ORIFICE CASING FILLING APPARATUS

Earnest H. Clark, Jr., Downey, Calif., assignor to Baker Oil Tools, Inc., Los Angeles, Calif., a corporation of California Original No. 2,829,719, dated April 8, 1958, Serial No. 420,522, April 2, 1954. Application for reissue December 22, 1958, Serial No. 782,342

21 Claims. (Cl. 166—224)

Matter enclosed in heavy brackets [ ] appears in the original patent but forms no part of this reissue specification; matter printed in italics indicates the additions made by reissue.

The present invention relates to subsurface well devices, and more particularly to apparatus for controlling the automatic filling of a string well casing, and similar well conduits, while the latter is being lowered in a well bore containing fluid.

An object of the invention is to provide apparatus adapted to form part of a conduit string which can automatically vary the rate at which well bore fluid can flow into the conduit string as the latter is lowered in the well bore.

Another object of the invention is to provide apparatus adapted to form part of a conduit string, which is capable of automatically varying the rate at which well bore fluid can flow into the conduit string, the rate of flow being prevented from becoming excessive.

A further object of the invention is to provide apparatus embodying a variable size orifice for controlling the flow of well bore fluid into a conduit string containing the apparatus as the conduit string is lowered in the well bore, the size of the orifice automatically increasing with increased pressure differential across it. In one aspect of the invention, the orifice size can only increase to a certain extent, after which further increase in the pressure differential is ineffective to correspondingly increase the orifice size and, in fact, may produce a decrease in the orifice size to prevent too great a rate of fluid flow into the conduit string.

Yet another object of the invention is to provide apparatus embodying a variable size orifice for automatically controlling the flow of well bore fluid into a well casing, or the like, embodying the apparatus, in which the size of the orifice is prevented from increasing beyond a certain value, to insure upward flow of sufficient fluid around the outside of the casing while it is being lowered in the well bore for the purpose of washing away detritus that might have become separated from the wall of the well bore, thereby preventing the formation of bridges and similar restrictions which might prevent the continued downward passage of the well casing in the well bore.

Still a further object of the invention is to provide an apparatus for automatically controlling the filling of a well conduit with well bore fluid, the apparatus being comparatively short in length, with attendant relative low cost of manufacture, and containing readily drillable material to facilitate the disintegration of the internal portion of the apparatus under the action of a drill bit after such internal portion has served its purposes.

Another object of the invention is to provide an improved apparatus for automatically controlling the filling of a well conduit with well bore fluid, in which the apparatus also serves as a back pressure valve to prevent reverse or upward flow of fluid in the conduit after the filling operation has been completed.

A further object of the invention is to provide an apparatus embodying a flexible orifice device for controlling flow of well bore fluid into the conduit string embodying the apparatus, the orifice device also functioning as a back pressure valve seat engageable by a back pressure valve element, to prevent upward flow of fluid into the conduit string after the filling operation has been completed.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings.

Figure 1:
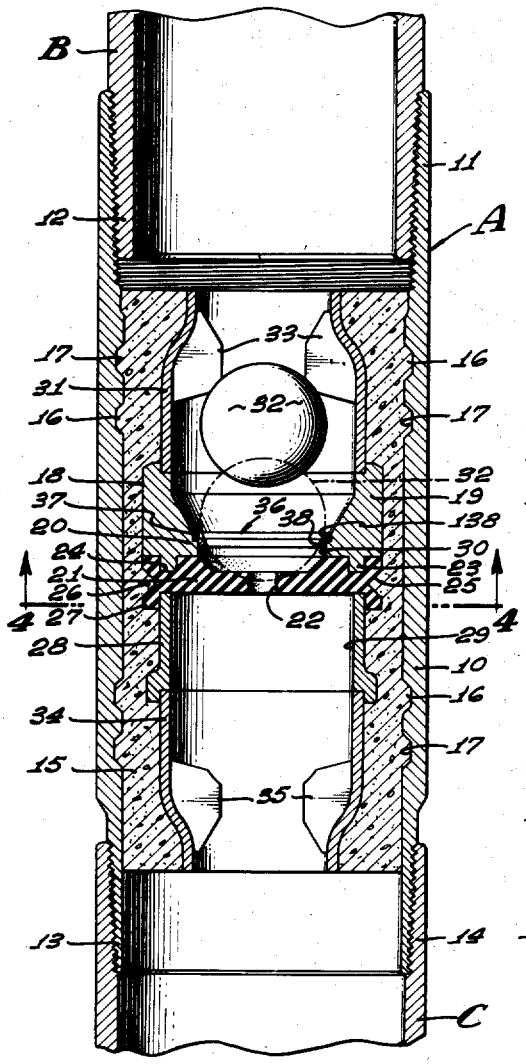
Figure 1 is a longitudinal section through an apparatus embodying the invention, with the parts occupying one relative position.

The apparatus disclosed in the drawings has the purpose of controlling the rate at which fluid in the well bore can flow into a string of well casing, or similar conduit string, as the latter is being lowered in the well bore to the desired depth. The apparatus is also effective to prevent upward or return flow of fluid in the well casing after it has been filled with the well bore fluid, as for the purpose of preventing cementitious material from flowing back into the casing string following the completion of a cementing operation.

The specific apparatus disclosed is a casing collar A adapted to interconnect upper and lower casing sections B, C. The apparatus, however, may constitute the lower terminus of the string of well casing, in which event it would be considered to be a casing shoe.

The apparatus consists of an outer tubular member 10 which may have an upper threaded box 11 threadedly secured on the lower pin end 12 of the upper casing section B, and a lower threaded pin 13 threadedly secured in the upper box end 14 of the lower casing section C. A valve mechanism is contained within the apparatus and this valve mechanism is preferably made of readily drillable material. Thus, a portion of the interior of the tubular member 10 may be filled by an annulus of cementitious material 15 anchored to the tubular member 10 by external ribs 16 of the cementitious plug cast into longitudinally spaced internal grooves 17 in the tubular member. This cementitious plug encompasses a valve body or housing 18 which may be made of several parts. An upper valve body 19 is held within the plug 15, this body having an inwardly projecting portion 20 to provide a relatively wide transverse surface bearing against the upper surface of a rubber, or rubber-like, orifice disc 21 having a comparatively small orifice or passage 22 through its central portion.

The rubber disc 21 may be assembled to the lower end of the upper valve body 19 by causing a circumferential rib 23 on the latter to project downwardly into a companion upper groove 24 in the orifice disc. The orifice member 21 has a peripheral groove 25 to receive a rib 26 of cementitious plug material, in order to anchor the orifice disc to the cement plug. Depending from the main body of the orifice disc 21 is a relatively short skirt portion 27 into which a generally cylindrical lower valve body 28 is piloted. The inner wall 29 of this valve body is disposed laterally outward to a substantial extent with respect to the inner wall 30 of the base portion 20 of the upper valve body, for a purpose that will be described hereinafter.

The rubber orifice 21 will control the passage of fluid in the string of well casing as the latter is lowered through the fluid in a well bore. It is also desired to cause the rubber orifice member 21 to function as the seat of a back pressure valve, which is preferably incorporated in the apparatus. Thus, the upper end of the upper valve body 19 receives the lower end of an upper valve housing and retainer 31, which is encompassed by the upper portion of the cementitious plug 15. This upper housing may contain a back pressure valve element 32, preferably in the form of a ball buoyant in cement slurry. Upward movement of this ball 32 is limited by its engagement with a plurality of circumferentially spaced stop lugs 33 integral with and extending inwardly from the housing 31. It is to be noted that the inside diameter of the housing 31 is substantially greater than the diameter of the ball 32, to allow fluid to flow around the ball valve element 32 and between the stop lugs 33 into the casing section B above the apparatus A.

A lower ball valve retainer housing 34 is disposed within the cementitious plug 15, the upper end of this housing being piloted within the lower portion of the lower valve body 28. This valve housing 34 is essentially the same as the upper housing 31, but is inverted with respect thereto. It also has a plurality of circumferentially spaced stop lugs 35 engageable by the ball valve element 32 after the latter has been forced through the rubber orifice 21, in the manner described hereinbelow. The lower housing 34 also has an internal diameter substantially greater than the ball diameter, to allow fluid to flow therebetween when the ball 32 is disposed in the lower housing.

The ball valve element 32 is initially positioned in the upper valve housing 31. The least diameter through the upper valve body, which is the diameter of the inner wall 30, is slightly greater than the diameter of the ball 32, to allow the ball to be forced downward through the upper valve body 19 and against the orifice disc 21. When sufficient pressure is imposed on the ball valve member 32, the latter bears against the orifice disc 19 and will stretch its opening 22 sufficiently to force itself completely therethrough into the lower valve body 28 and lower housing 34. However, it is not desired that the ball 32 move inadvertently through the orifice passage 22. For that reason, a ball stop member 36 is provided in the upper valve housing or body 19 above the rubber orifice disc 21, on which the ball can seat. This stop member or ring 36 serves as a stop to prevent downward movement of the ball through the orifice, until desired. As disclosed, the ball stop member includes an outer ring 37 received within a counterbore 38 in the upper valve body 19 above its minimum size passage 30. This ring 37 is formed integrally with a seat 38 secured to the outer ring portion 37 by a relatively short circumferential area 39 of metal. The inner ring 38 projects inwardly from the outer ring portion 37 to a relatively short extent, having an inner ball engaging surface 40. The inner portion 38 below its shearable area 39 has an external periphery 41 conforming to the inner wall 30 of the valve body 19.

The apparatus A is disposed initially in the manner disclosed in Fig. 1, being secured to the upper and lower casing sections B, C. The casing string is lowered through the fluid in the well bore, this fluid passing upwardly through the orifice 22 in the rubber disc 21, urging the ball 32 upwardly against the upper stop lug 33. The fluid can flow around the ball 32 and on into the casing sections thereabove, thereby automatically filling the well casing with the well bore fluid. In view of the restricted area of the orifice passage 22, the fluid can only flow into the casing string at a restricted rate, which will prevent its overflowing the casing at the top of the well bore. If the casing is lowered at a rapid rate, the fluid pressure on the underside of the rubber orifice disc 21, as compared to the fluid pressure thereabove, will increase, bulging the rubber disc in an upward direction and increasing the size of the orifice 22, thereby allowing a greater rate of fluid flow through the orifice and into the casing string thereabove. Thus, the rubber orifice passage area can increase with increase in pressure differential, automatically allowing a greater rate of fluid flow into the casing as this pressure differential increases. As the pressure differential again decreases, the rubber orifice tends to close, to lower the rate of fluid flow into the casing string.

During the lowering of the casing string in the well bore, the latter is brought to rest at intervals, to enable additional casing sections to be secured to the string at the top of the well bore. When the casing string comes to rest, fluid can continue to flow through the orifice 22 until the hydrostatic head of fluid inside of the casing string equals that externally of the casing string. It is usual practice to elevate the casing to a slight extent, to free it from the slips (not shown) in the upper rotary table (not shown), prior to recommencing the lowering of the casing string in the well bore. Such upward elevation will cause the ball 32 to move downwardly into engagement with the shearable seat 38, but this seat is connected to the outer stop ring member 37 by sufficient metal to withstand substantial forces. Accordingly, the ball will not be forced downwardly through the orifice 22 into the lower valve body 28 and lower housing 34.

Figure 2:
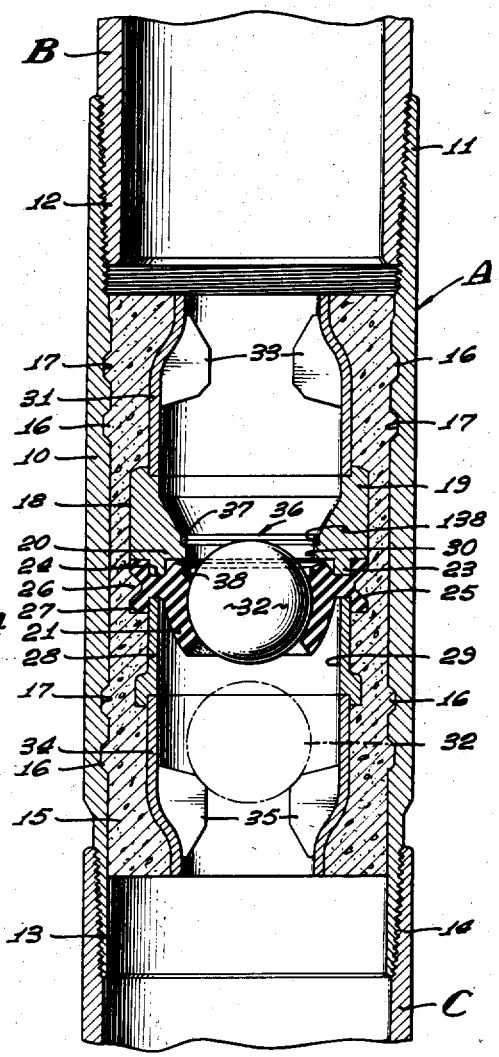
Fig. 2 is a view similar to Fig. 1, disclosing a back pressure valve element being forced through the variable orifice portion of the apparatus.
Figure 3:
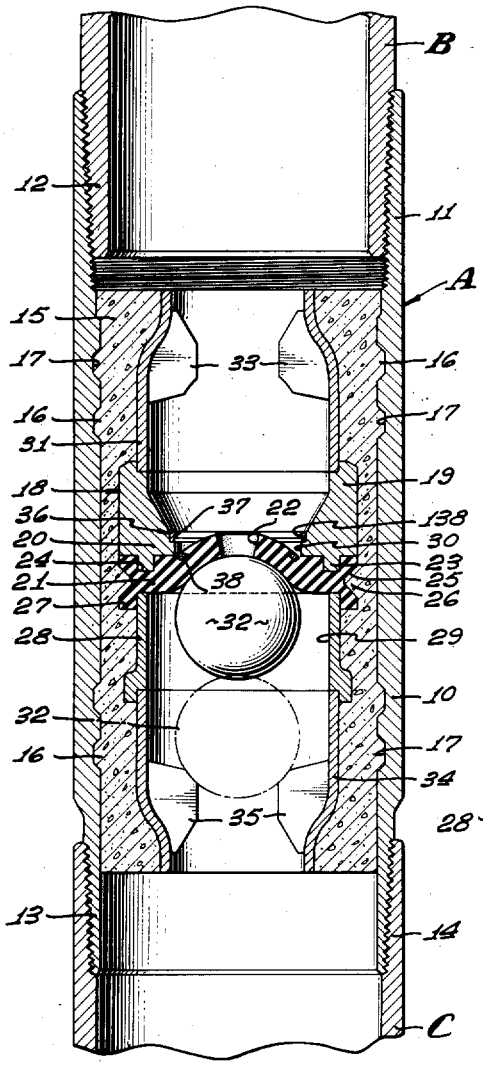
Fig. 3 is a view similar to Fig. 1, disclosing the back pressure valve element in the position in which it is effective to prevent upward flow of fluid through the apparatus.
Figure 5:
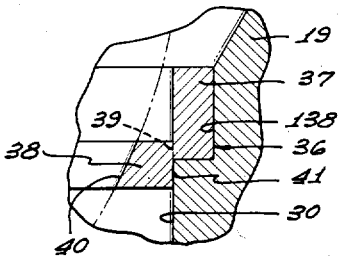
Fig. 5 is a fragmentary longitudinal section of a portion of the apparatus on an enlarged scale.
Figure 4:
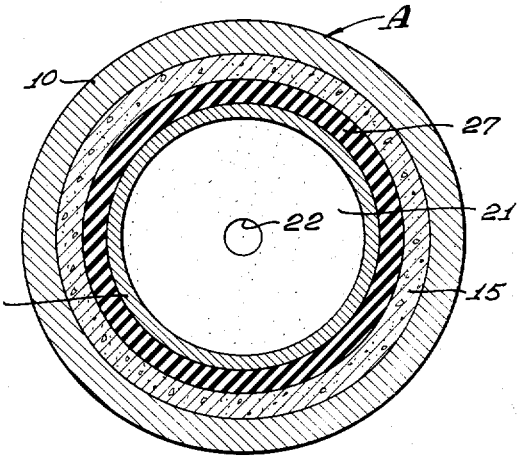
Fig. 4 is a cross-section, on an enlarged scale, taken along the line 4—4 of Fig. 1.

The casing string is lowered in the well bore until it has been disposed at the desired landing depth, the orifice member 21 automatically controlling the volumetric rate of fluid flow into the casing. After such landing depth has been reached and the casing is filled with fluid, pressure can be applied to the fluid in the casing string, this pressure forcing the ball valve element 32 downwardly against its seat 38. When the fluid pressure is increased to a value corresponding to the shear strength of the area 39 of the stop ring member (which, for example, may be 1,000 p.s.i.), the inner seat member 38 is sheared from the outer portion 37, the ring 38 being moved down through the minimum value body passage 30 and into and against the upper surface of the rubber disc 21. After reaching the rubber disc below the minimum body passage region 30, the pressure of the ball acting on the inclined seat 38 effectively splits the seat and urges it laterally outward into the rubber material itself. The ball can then be pumped down against the orifice disc 21, stretching the latter in a downward and outward direction, opening the size of the orifice 22 to a considerable extent, until the ball is pumped completely through it (Fig. 2). Such downward and lateral stretching of the orifice disc 21 can occur since the lower surface of the disc has very little backing from the lower valve body 28, the inner wall 29 of the latter being displaced laterally outward to provide an inside diameter which is substantially greater than the diameter of the ball 32. The ball is thus pumped through the rubber orifice disc 21 and into the lower body 28 and lower housing 34, coming to rest upon the stop lugs 35. When pumped through the disc 21, and upon the relieving of the pressure in the casing string above the apparatus, the disc will inherently resume its original shape, such as disclosed in Fig. 1.

Fluid can now be pumped downwardly through the casing string, this fluid passing through the upper housing 31 and upper valve body 19, and through the rubber orifice passage 22, flowing into the lower valve body 28 and lower housing 34, from where it passes around the ball 32, between the lower stop lugs 35, and out into the lower casing sections C for discharge from the well casing. If the well casing is to be cemented in the well bore, the required quantity of cement slurry can be pumped down the casing string, this cement slurry being pumped through the orifice 22. If the pressure above the orifice member 21 increases, then the latter will merely bulge in a downward direction to increase the orifice area, allowing a greater rate of flow of the cement slurry through the apparatus. The cement slurry will discharge from the casing at some point below the apparatus, and will then pass upwardly into and through the annulus between the exterior of the casing string and the wall of the well bore. When sufficient cement slurry has been deposited behind the casing string, the pressure inside of the well casing may be relieved. The cement slurry will tend to flow back into the casing string, but in so doing, it will elevate the ball valve element 32 upwardly into engagement with the rubber orifice disc 21. The ball valve element engages the disc and effectively closes the orifice 22 against upward passage of fluid therethrough. If the back pressure is high, it will merely force the ball upwardly to bulge the orifice disc in an upward direction. However, the upper valve body 19 projects inwardly to a substantial extent, the minimum diameter 30 of this upper valve body being only slightly greater than the diameter of the ball. As a result, the ball will jam the rubber material between it and the upper valve body 19 with great force, the rubber material preventing upward passage of fluid back through the upper valve body 19, even under high back pressure differential conditions.

After the cement slurry has set and hardened, the internal mechanism of the apparatus A can be disintegrated by a suitable drill bit (not shown). Substantially all of the internal mechanism is made of readily drillable material. The cementitious plug 15 is readily drillable, as well as the upper and lower housings 31, 34, the upper and lower valve bodies 19, 28, and the rubber disc 21. The housings and bodies may be made of a suitable synthetic resin, whereas the stop ring 36 for the ball 32 can be made of cast iron, which is also readily drillable. The internal mechanism is easily removable under the action of a drill bit, and since it is relatively short in length, the time required to effect its disintegration by a drilll bit is shortened.

Instead of incorporating the valve ball 32 in the apparatus while the casing string is being lowered in the well bore, it may be disposed in the well casing at a later time. Were this to occur, the upper valve housing 31 need not be provided, which will allow the apparatus to be shortened to a substantial extent. The valve element 32 may be placed on top or near the upper portion of the charge of cement slurry as it is being pumped in a downward direction through the casing string. Upon reaching the rubber orifice disc 21, it will be pumped through the latter into the lower valve body 28 and lower valve housing 34, being effective to move upwardly into engagement with the valve disc 21, sealing against the latter and preventing return flow of fluid upwardly through the orifice 22 and into the casing string. Under these conditions, the stop ring 36, with its shearable seat 38, will also be unnecessary.

The rubber orifice arrangement is usable without the back pressure valve 32, in order to controllably fill the well casing, in dependence upon the pressure differential across the rubber orifice 21. If no valve 32 is used, the lower housing 34 can also be omitted.

In running certain strings of well casing in well bores, centering devices and wall scratchers are sometimes mounted thereon to insure a proper annulus of cement around the well casing as a result of the cementing operation. Such devices are effective, but they also scratch or scrape drilling mud and detritus from the formation wall, this material falling into the annulus between the casing string and the wall of the well bore. The lowering of the casing string in the well bore displaces a corresponding volume of fluid in the well bore, the net result being that the fluid in the well bore is caused to flow in an upward direction and out at the top of the hole. Such upward flow of fluid will carry a large portion of the detritus that may have been removed from the wall of the well bore out of the hole. If this material is not removed, it may seriously restrict or prevent the downward travel of the casing string in the well bore by forming an annular bridge thereagainst.

In the apparatus heretofore described, the rubber orifice 21 can open to a considerable extent, if the pressure differential thereacross increases sufficiently, thereby allowing a large portion of the well bore fluid to flow upwardly in the casing string at a high rate, leaving an insufficient amount to pass upwardly around the casing string, for the purpose of removing the detritus and preventing the formation of bridges and similar restrictions. This disadvantageous effect is prevented in the apparatus shown in Figs. 6 to 9, inclusive. In general, the apparatus is substantially the same as the one heretofore described, except that a limit is placed upon the extent of the opening of the orifice passage 22. In place of the ball stop ring 36, a backing plate 50 extends inwardly from the upper valve body 19a to a substantial extent. The backing plate 50 is disposed a slight distance above the rubber orifice disc 21, being integrated with the valve body 19a by a relatively small area 51 of shearable material. The back-up plate 50 has a passage 52 therethrough which is substantially greater in area than the passage 22 through the orifice 21 when the latter has no pressure differential thereacross. The area of the back-up plate passage 52 may be made equal to the maximum passage area that is desired through the apparatus, and will, therefore, place a limit upon the rate of flow of the fluid into the well casing as it is lowered in the well bore. The back-up plate also serves as a stop or seat for the ball valve element 32, to initially prevent it from inadvertently being forced downward through the rubber orifice disc 21 into the lower body and housing 28, 34.

Figure 6:
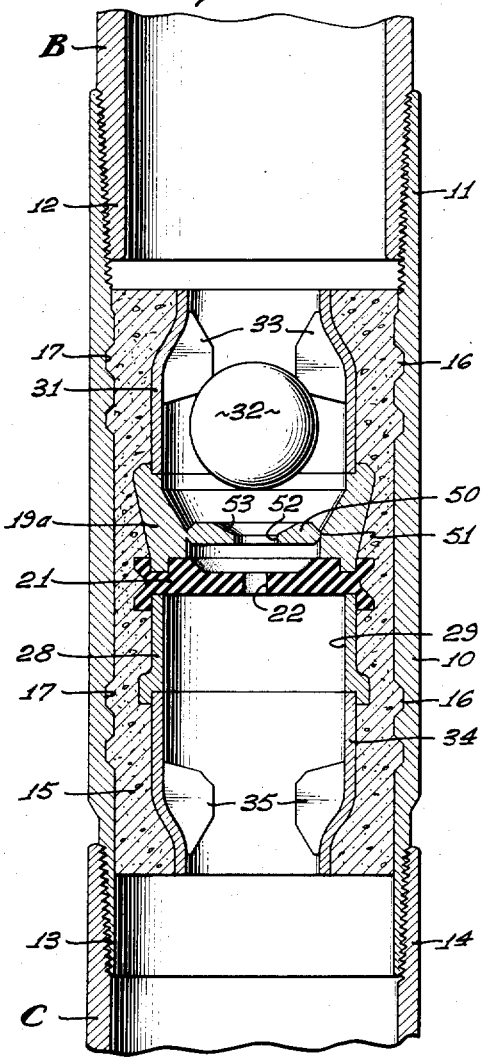
Fig. 6 is a view similar to Fig. 1 of another embodiment of the invention.
Figure 8:
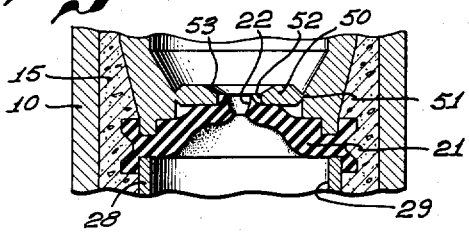
Fig. 8 is a view similar to Fig. 7, with the orifice in still another position.
Figure 9:
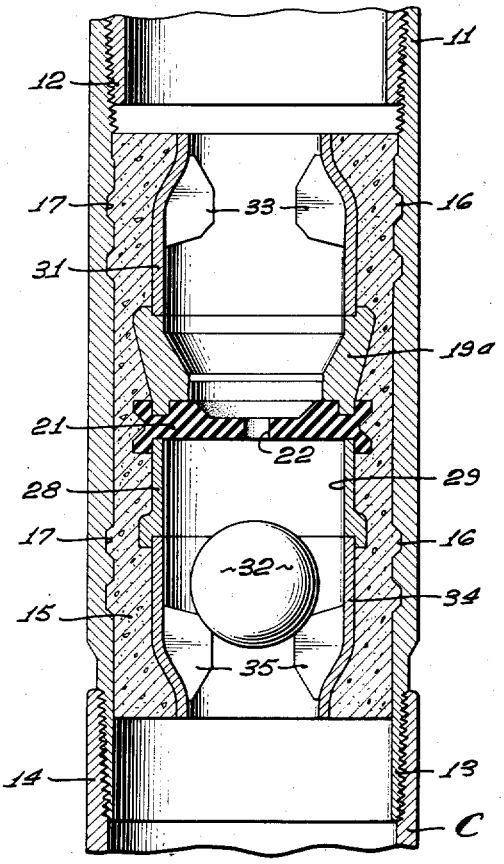
Fig. 9 is a longitudinal section through the apparatus shown in Fig. 6, with the back pressure valve element below the variable orifice.
Figure 7:
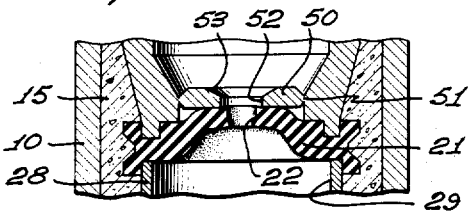
Fig. 7 is a longitudinal section through the variable orifice portion of the apparatus shown in Fig. 6, the orifice being disposed in another position.

With the apparatus disclosed in Fig. 6, as the casing is being lowered in the well bore, the fluid will pass upwardly through the orifice passage 22 in the same manner as in the other form of the invention. As the pressure differential across the rubber disc 21 increases, it is bulged in an upward direction, increasing the area of the orifice 22. However, as the pressure differential increases, the disc eventually is bulged upwardly into contact with the back-up plate 50, which will prevent its further upward bulging and further increase in the area of the orifice passage. When the rubber disc engages the back-up plate, the area of its passage 22 is still preferably less than the area of the passage 52 through the back-up plate. If the pressure differential were to increase to still a further extent, the rubber material around the orifice passage 22 is actually forced partly into the back-up plate passage 52 (as shown in Fig. 8). Such deformation of the rubber material will cause the rubber orifice passage 22 to decrease in size, thereby retarding the rate of fluid flow through the orifice and into the casing string thereabove.

With the apparatus shown in Fig. 6, a limit is put on the rate at which the fluid will flow into the casing string, insuring the presence of a large amount of fluid in the well bore to be displaced for upward flow through the annulus around the casing string, carrying detritus and other materials upwardly to the top of the well bore, or at least to move such materials in an upward direction to a sufficient extent to prevent the formation of bridges and similar restrictions in the well bore.

After the casing string has been lowered to the desired depth and the casing has been allowed to fill completely with fluid in the well bore, the fluid in the well casing can be subjected to sufficient pressure from above to force the ball 32 downwardly into engagement with the upper seat 53 of the back-up plate 50. When the pressure increases sufficiently (for example, to 1,000 p.s.i.), the back-up plate is sheared at the area 51 from the upper valve body 19a. Not only is this back-up plate sheared, but since it is made of cast iron, or similar readily breakable material, it will actually shatter or break into many pieces, being pumped completely through the orifice disc 21 ahead of the ball 32, the latter, of course, also passing through the orifice 22 and into the lower valve body 28 and lower housing 34, where it can later function as a back pressure valve element, moving upwardly into engagement with the rubber orifice disc 21 as a companion valve seat. The shattered pieces of the back-up plate 50 will be pumped completely out of the apparatus A.

In all respects, the apparatus shown in Fig. 6 functions in the same manner as the apparatus disclosed in Figs. 1 to 5, inclusive. However, in addition, it places a limit on the extent of opening of the orifice passage 22 in the rubber disc 21, and, in fact, causes this opening to decrease in the event pressure differential becomes excessive.

The inventor claims:

1. In apparatus of the character described: a conduit string including a tubular member having a passage, said conduit string being adapted to be lowered through fluid in a well bore; a pliant, elastic [member] *disc* secured in said tubular member and extending across said passage, said elastic [member] *disc* having an orifice therethrough to allow well bore fluid to flow through said tubular member and into said conduit string at a restricted rate during lowering of the conduit string in the well bore, the central portion of said elastic [member] *disc* being unrestrained against upward movement in said tubular member and being of such thickness as to be distorted by fluid pressure in an upward direction to enlarge and increase the area of said orifice as the fluid pressure differential across said elastic [member] *disc* increases during lowering of the conduit string in the well bore at normal rates.

2. In apparatus of the character described: a conduit string including a tubular member having a passage, said conduit string being adapted to be lowered through fluid in a well bore; a pliant, elastic member secured in said tubular member and extending across said passage, said elastic member having an orifice therethrough to allow well bore fluid to flow through said tubular member at a restricted rate during lowering of the conduit string in the well bore, the central portion of said elastic member being unrestrained against upward movement in said tubular member and being of such thickness as to be distorted by fluid pressure in an upward direction to enlarge and increase the area of said orifice as the fluid pressure differential across said elastic member increases during lowering of the conduit string in the well bore at normal rates; and a valve member normally displaced from said orifice and substantially larger in cross-sectional area than said orifice, said valve member being movable longitudinally within said tubular member from one side of said elastic member, through said orifice, to the opposite side of said elastic member.

3. In apparatus of the character described: a conduit string including a tubular member having a passage, said conduit string being adapted to be lowered through fluid in a well bore; a pliant, elastic member secured in said tubular member and extending across said passage, said elastic member having an orifice therethrough to allow well bore fluid to flow through said tubular member at a restricted rate during lowering of the conduit string in the well bore, the central portion of said elastic member being unrestrained against upward movement in said tubular member and being of such thickness as to be distorted by fluid pressure in an upward direction to enlarge and increase the area of said orifice as the fluid pressure differential across said elastic member increases during lowering of the conduit string in the well bore at normal rates; and a valve member normally disposed above said elastic member and out of said orifice and substantially larger in cross-sectional area than said orifice, said valve member being movable within said tubular member from a position above said elastic member, through said orifice, to a position below said elastic member.

4. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a valve member substantially larger in cross-sectional area than said orifice movable longitudinally within said tubular member from one side of said elastic member, through said orifice, to the opposite side of said elastic member; said valve member being adapted to seat against said elastic member after moving to said opposite side thereof to close said orifice; and means engaging said elastic member to prevent said valve member from moving back from said opposite side, through said orifice, to said one side of said elastic member.

5. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a valve member substantially larger in cross-sectional area than said orifice movable within said tubular member from a position above said elastic member, through said orifice, to a position below said elastic member; said valve member being movable upwardly to seat against said elastic member and close said orifice after moving to said position below said elastic member; and means engaging said elastic member to prevent said valve member from moving upwardly back through said orifice.

6. In apparatus of the character described: a tubular member having a passage and adapted to form part of a conduit string to be lowered in a well bore; a pliant, elastic member secured to said tubular member and extending across said passage, said elastic member having an orifice therethrough to allow fluid to flow through said tubular member at a restricted rate; a stop member detachably secured to said tubular member on one side of said elastic member; a valve member on said one side of said elastic member substantially larger in cross-sectional area than said orifice movable longiutdinally within said tubular member into engagement with said stop member to detach said stop member from said tubular member and enable said valve member to move through said orifice to the opposite side of said elastic member.

7. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a stop member above said elastic member detachably secured to said tubular member; a valve member substantially larger in cross-sectional area than said orifice disposed above said stop member and movable downwardly into engagement with said stop member to detach said stop member from said tubular member and enable said valve member to move down through said orifice to a position below said elastic member.

8. In apparatus of the character described: a tubular member having a passage and adapted to form part of a conduit string to be lowered in a well bore; a pliant, elastic member secured to said tubular member and extending across said passage, said elastic member having an orifice therethrough to allow fluid to flow through said tubular member at a restricted rate; a stop member detachably secured to said tubular member on one side of said elastic member; a valve member on said one side of said elastic member substantially larger in cross-sectional area than said orifice movable longitudinally within said tubular member into engagement with said stop member to detach said stop member from said tubular member and enable said valve member to move through said orifice to the opposite side of said elastic member; said valve member being adapted to seat against said elastic member after moving to said opposite side thereof to close said orifice; and means engaging said elastic member to prevent said valve member from moving back from said opposite side, through said orifice, to said one side of said elastic member.

9. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a stop member above said elastic member detachably secured to said tubular member; a valve member substantially larger in cross-sectional area than said orifice disposed above said stop member and movable downwardly into engagement with said stop member to detach said stop member from said tubular member and enable said valve member to move down through said orifice to a position below said elastic member; said valve member being movable upwardly to seat against said elastic member and close said orifice after moving to said position below said elastic member; and means engaging said elastic member to prevent said valve member from moving upwardly back through said orifice.

10. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a valve member substantially larger in cross-sectional area than said orifice movable longitudinally within said tubular member from one side of said elastic member, through said orifice, to the opposite side of said elastic member; said valve member being adapted to seat against said elastic member after moving to said opposite side thereof to a close said orifice; means engagnig said elastic member to prevent said valve member from moving back from said opposite side, through said orifice, to said one side of said elastic member; and means in said tubular member engageable with said valve member to prevent removal of said valve member from said tubular member when said valve member is on said opposite side of said elastic member.

11. In apparatus of the character described; a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a valve member substantially larger in cross-sectional area than said orifice movable within said tubular member from a position above said elastic member, through said orifice, to a position below said elastic member; said valve member being movable upwardly to seat against said elastic member and close said orifice after moving to said position below said elastic member; means engaging said elastic member to prevent said valve member from moving upwardly back through said orifice; and means in said tubular member below said elastic member engageable with said valve member to hold said valve member in said tubular member when said valve member is disposed below said elastic member.

12. In apparatus of the character described: a tubular member having a passage and adapted to form part of a conduit string to be lowered in a well bore; a pliant, elastic member secured to said tubular member and extending across said passage, said elastic member having an orifice therethrough to allow fluid to flow through said tubular member at a restricted rate; a stop member detachably secured to said tubular member on one side of said elastic member; a valve member on said one side of said elastic member substantially larger in cross-sectional area than said orifice movable longitudinally within said tubular member into engagement with said stop member to detach said stop member from said tubular member and enable said valve member to move through said orifice to the opposite side of said elastic member; said valve member being adapted to seat against said elastic member after moving to said opposite side thereof to close said orifice; means engaging said elastic member to prevent said valve member from moving back from said opposite side, through said orifice, to said one side of said elastic member; and means in said tubular member engageable with said valve member to prevent removal of said valve member from said tubular member when said valve member is on said opposite side of said elastic member.

13. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a stop member above said elastic member detachably secured to said tubular member; a valve member substantially larger in cross-sectional area than said orifice disposed above said stop member and movable downwardly into engagement with said stop member to detach said stop member from said tubular member and enable said valve member to move down through said orifice to a position below said elastic member; said valve member being movable upwardly to seat against said elastic member and close said orifice after moving to said position below said elastic member; means engaging said elastic member to prevent said valve member from moving upwardly back through said orifice; and means in said tubular member below said elastic member engageable with said valve member to hold said valve member in said tubular member when said valve member is disposed below said elastic member.

14. In apparatus of the character described: a conduit string including a tubular member having a passage, said conduit string being adapted to be lowered through fluid in a well bore; a pliant, elastic member secured in said tubular member and extending across said passage, said elastic member having an orifice therethrough to allow fluid to flow through said tubular member at a restricted rate during lowering of the conduit string in the well bore, the central portion of said elastic member being unrestrained against upward movement in said tubular member and being of such thickness as to be distorted by fluid pressure in an upward direction to enlarge and increase the area of said orifice as the fluid pressure differential across said elastic member increases during lowering of the conduit string in the well bore at normal rates; a valve member normally disposed above said elastic member and out of said orifice and substantially larger in cross-sectional area than said orifice, said valve member being movable within said tubular member from a position above said elastic member, through said orifice, to a position below said elastic member; and stop means in said tubular member above said elastic member to limit upward movement of said valve member in said tubular member when said valve member is disposed above said elastic member.

15. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a valve member substantially larger in cross-sectional area than said orifice movable within said tubular member from a position above said elastic member, through said orifice, to a position below said elastic member; said valve member being movable upwardly to seat against said elastic member and close said orifice after moving to said position below said elastic member; means engaging said elastic member to prevent said valve member from moving upwardly back through said orifice; means in said tubular member below said elastic member engageable with said valve member to hold said valve member in said tubular member when said valve member is disposed below said elastic member; and means in said tubular member above said elastic member engageable with said valve member to hold said valve member in said tubular member when said valve member is disposed above said elastic member.

16. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a frangible stop member secured to said tubular member on one side of said elastic member; a valve member on said one side of said elastic member substantially larger in cross-sectional area than said orifice and movable longitudinally within said tubular member into engagement with said stop member to disrupt said stop member and then move through said orifice to the opposite side of said elastic member.

17. In apparatus of the character described: a conduit string including a tubular member having a passage, said conduit string being adapted to be lowered through fluid in a well bore; a pliant, elastic member secured in said tubular member and extending across said passage, said elastic member having a central portion initially unrestrained against upward movement in said tubular member, said central portion having an orifice therethrough to allow well bore fluid to flow through said tubular member and into said conduit string at a restricted rate; and a backing member secured to said tubular member on one side of and adjacent said elastic member and having a central portion initially spaced from said central portion of said orifice member, said central portion of said backing member having a passage therethrough of greater area than said orifice and also having a surface surounding said passage transverse to the direction of flow of fluid through said passage, said central portion of said elastic member being deformable toward said transverse surface by fluid in the well bore to increase the area of its orifice to the extent limited by engagement of said central portion of said elastic member with said transverse surface.

18. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a backing member detachably secured to said tubular member on one side of and adjacent said elastic member, said backing member having a passage therethrough of greater area than said orifice, said elastic member being deformable by fluid in the well bore to increase the area of its orifice to the extent limited by engagement of said elastic member with said backing member; and a valve member on said one side of said elastic member substantially larger in cross-sectional area than said orifice and movable longitudinally within said tubular member into engagement with said backing member to detach said backing member from said tubular member and then move through said orifice to the opposite side of said elastic member.

19. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a backing member detachably secured to said tubular member on one side of and adjacent said elastic member, said backing member having a passage therethrough of greater area than said orifice, said elastic member being deformable by fluid in the well bore to increase the area of its orifice to the extent limited by engagement of said elastic member with said backing member; a valve member on said one side of said plastic member substantially larger in cross-sectional area than said orifice and movable longitudinally within said tubular member into engagement with said backing member to detach said backing member from said tubular member and then move through said orifice to the opposite side of said elastic member; said valve member being adapted to seat against said elastic member after moving to said oposite side thereof to close said orifice; and means engaging said elastic member to prevent said valve member from moving back from said opposite side, through said orifice, to said one side of said elastic member.

20. In apparatus of the character described: a tubular member having a passage and adapted to form part of a conduit string to be lowered in a well bore; a pliant, elastic member secured in said tubular member and extending across said passage, said elastic member having an orifice therethrough to allow fluid to flow through said tubular member at a restricted rate; a backing member above and adjacent said elastic member and secured to said tubular member, said backing member having a passage therethrough of greater area than said orifice, said elastic member being deformable by fluid in the well bore to increase the area of its orifice to the extent limited by engagement of said elastic member with said backing member; a valve member above said elastic member substantially larger in cross-sectional area than said orifice movable downwardly within said tubular member into engagement with said backing member to detach said backing member from said tubular member and then move down through said orifice to a position below said elastic member; said valve member being adapted to seat upwardly against said elastic member to close said orifice when disposed below said elastic member; and means engaging said elastic member to prevent said valve member from moving upwardly through said orifice to a position above said elastic member.

21. In apparatus of the character described: a conduit string including a tubular member having a passage, said conduit string being adapted to be lowered through fluid in a well bore; a pliant, elastic [member] *disc* secured in said tubular member and extending across said passage, said elastic [member] *disc* having an orifice therethrough to allow well bore fluid to flow through said tubular member and into the conduit string at a restricted rate during lowering of the conduit string in the well bore, said elastic [member] *disc* having its outer portion substantially thicker than its central portion, the central portion of said elastic [member] *disc* being unrestrained against upward movement in said tubular member and being of such thickness as to be distorted by fluid pressure in an upward direction to enlarge and increase the area of said orifice as the fluid pressure differential across said elastic [member] *disc* increases during lowering of the conduit string in the well bore at normal rates.

References Cited in the file of this patent or the original patent

UNITED STATES PATENTS

| | | |
|---|---|---|
| 2,435,016 | Pitts | Jan. 27, 1948 |
| 2,500,750 | Halenza | Mar. 14, 1950 |
| 2,545,000 | Martin | Mar. 13, 1951 |
| 2,593,315 | Kraft | Apr. 15, 1952 |
| 2,702,046 | Zimmer | Feb. 15, 1955 |